(12) United States Patent
Vaidyanathan et al.

(10) Patent No.: US 7,752,866 B2
(45) Date of Patent: Jul. 13, 2010

(54) SHAPE MEMORY THERMAL CONDUCTION SWITCH

(75) Inventors: Rajan Vaidyanathan, Oviedo, FL (US); Vinu Krishnan, Hallandale, FL (US); William U. Notardonato, Merritt Island, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 60 days.

(21) Appl. No.: 12/330,350

(22) Filed: Dec. 8, 2008

(65) Prior Publication Data

US 2009/0184798 A1    Jul. 23, 2009

Related U.S. Application Data

(60) Provisional application No. 61/012,285, filed on Dec. 7, 2007.

(51) Int. Cl.
*F28F 27/00*    (2006.01)
*F25D 29/00*    (2006.01)
*H01H 37/48*    (2006.01)

(52) U.S. Cl. .................... 62/383; 337/393; 337/394; 165/276

(58) Field of Classification Search ................. 337/393, 337/394; 165/276; 62/383
See application file for complete search history.

(56) References Cited

U.S. PATENT DOCUMENTS

| | | | | |
|---|---|---|---|---|
| 3,302,703 A | * | 2/1967 | Kelly | 165/135 |
| 3,306,075 A | * | 2/1967 | Cowans | 62/51.1 |
| 3,489,203 A | * | 1/1970 | Fischell | 165/274 |
| 3,531,752 A | * | 9/1970 | Gourley | 337/139 |
| 3,783,429 A | * | 1/1974 | Otte | 337/393 |
| 4,770,004 A | * | 9/1988 | Lagodmos | 62/383 |
| 5,108,214 A | * | 4/1992 | Milam | 403/28 |
| 5,379,601 A | * | 1/1995 | Gillett | 62/51.1 |

(Continued)

FOREIGN PATENT DOCUMENTS

JP    60030994 A  *  2/1985

(Continued)

OTHER PUBLICATIONS

Lemanski et al; A Low Hysteresis Nitife Shape Memory Alloy Based Thermal Conducton Switch '2006 American Institute of Physics; pp. 3-10.

*Primary Examiner*—Anatoly Vortman
(74) *Attorney, Agent, or Firm*—Jetter & Associates, P.A.

(57) ABSTRACT

A thermal conduction switch includes a thermally-conductive first member having a first thermal contacting structure for securing the first member as a stationary member to a thermally regulated body or a body requiring thermal regulation. A movable thermally-conductive second member has a second thermal contacting surface. A thermally conductive coupler is interposed between the first member and the second member for thermally coupling the first member to the second member. At least one control spring is coupled between the first member and the second member. The control spring includes a NiTiFe comprising shape memory (SM) material that provides a phase change temperature <273 K, a transformation range <40 K, and a hysteresis of <10 K. A bias spring is between the first member and the second member. At the phase change the switch provides a distance change (displacement) between first and second member by at least 1 mm, such as 2 to 4 mm.

20 Claims, 7 Drawing Sheets

U.S. PATENT DOCUMENTS

| | | | |
|---|---|---|---|
| 5,535,815 A | 7/1996 | Hyman | |
| 5,771,967 A * | 6/1998 | Hyman | 165/274 |
| 5,842,348 A * | 12/1998 | Kaneko et al. | 62/51.1 |
| 5,875,096 A * | 2/1999 | Gates | 361/704 |
| 6,140,903 A | 10/2000 | Kalapodis et al. | |
| 6,191,679 B1 | 2/2001 | Kalapodis et al. | |
| 6,276,144 B1 * | 8/2001 | Marland et al. | 62/51.1 |
| 6,294,977 B1 | 9/2001 | Kalapodis et al. | |
| 6,300,858 B1 | 10/2001 | Kalapodis et al. | |
| 6,305,174 B1 * | 10/2001 | Binneberg et al. | 62/6 |
| 6,438,967 B1 * | 8/2002 | Sarwinski et al. | 62/6 |
| 6,608,752 B2 * | 8/2003 | Morris et al. | 361/700 |
| 6,829,145 B1 * | 12/2004 | Corrado et al. | 361/704 |
| 7,154,369 B2 * | 12/2006 | Dietz et al. | 337/394 |
| 2003/0085659 A1 * | 5/2003 | Overmann et al. | 315/32 |
| 2005/0099776 A1 * | 5/2005 | Xue et al. | 361/700 |
| 2010/0065263 A1 * | 3/2010 | Tanchon et al. | 165/277 |

FOREIGN PATENT DOCUMENTS

| | | | |
|---|---|---|---|
| JP | 62046273 A | * | 2/1987 |
| JP | 02171594 A | * | 7/1990 |

* cited by examiner

PRIOR ART

SHAPE MEMORY THERMAL CONDUCTION SWITCH

CROSS REFERENCE TO RELATED APPLICATIONS

This application claims the benefit of Provisional Application Ser. No. 61/012,285 entitled "SHAPE MEMORY THERMAL CONDUCTION SWITCH", filed Dec. 7, 2007, which is herein incorporated by reference in its entirety.

RIGHTS UNDER FEDERALLY SPONSORED RESEARCH

The invention was sponsored in part by the U.S. National Aeronautical and Space Administration (NASA). The U.S. Government may have certain rights to the invention.

FIELD OF THE INVENTION

The invention is related to shape memory-based thermal conduction switches.

BACKGROUND OF THE INVENTION

Thermal conduction switches play an important role in heat management for numerous systems. One example is heat management in spacecrafts and satellites. Thermal conduction switches are used in spacecrafts and satellites for such applications as reservoir cooling, residual propellant scavenging, chill down of equipment, and long-term storage of ascent module propellant.

However, known thermal conduction switches fail to deliver one or more performance requirements needed for certain applications, such as for space and ground-based low-temperature environments. Such performance requirements include high efficiency, short cycle times, low hysteresis, good displacement, good thermal isolation in their open (non-conductive) state, high heat transfer ratios, high reliability and simplicity of design (e.g., no reliance on external sensors or complex actuation mechanisms). For example, space programs around the world have recently refocused on human spaceflight beyond low-Earth orbit. The United States and China have both declared an intention to establish human habitation on the moon, and the United States intends eventually to do so on Mars. Such extended human missions will require high-performance thermal conduction switches that provide performance and reliability beyond those currently known, for applications such as methane or oxygen liquefaction or storage. Accordingly, there is a need for high-performance, light, reliable and mechanically simple thermal conduction switches.

SUMMARY OF THE INVENTION

This Summary is provided to comply with 37 C.F.R. §1.73, presenting a summary of the invention to briefly indicate the nature and substance of the invention. It is submitted with the understanding that it will not be used to interpret or limit the scope or meaning of the claims.

In one embodiment of the invention, a thermal conduction switch comprises a thermally-conductive stationary member having a first thermal contact and structure for securing the first member as a stationary member, a thermally-conductive movable member having a second thermal contact, and a low-hysteresis shape memory (SM) comprising control spring interposed between the respective members. The respective members can comprise a variety of structures that provide surfaces for thermal conduction. The surfaces for thermal conduction can be planar surfaces, such as a plate, block or sheet, or be non-planar surfaces such as based on hill and valley, curved or ridged morphologies.

A thermal coupler provides thermal contact between the first and second members. A bias spring is between the first member and the second member. The stationary member is generally coupled (affixed) to a first body that is either thermally regulated or requiring thermal regulation and the movable member can be coupled to a second body that is either (i) thermally regulated if the first body requires thermal regulation or (ii) requiring thermal regulation if the first body is thermally regulated. The movable member is in switchable thermal communication, wherein in a first position, such as before or after phase change of the SM material, the movable member is in thermal communication with the second body, while in a second position the movable member is not in thermal communication with the second body.

The bias spring may be in series or in parallel with the SM spring. A series setup refers to the bias spring being coupled to act in-line and thus be positioned before or after the SM spring. A parallel setup refers to the bias spring being coupled to act along-side or around the SM spring. In embodiments of the invention the SM material for the spring provides a phase transformation (generally referred to herein as a phase change) at a low temperature, such as at a temperature in the range from 15 to 273 K, the range of the transformation (i.e. the temperature difference between start and finish of the phase change) <40 K such as <20 K or <15 K, a hysteresis <10 K, such as <2 K, and displacement of at least 1 mm, such as about 2 to 4 mm (or more) of displacement.

BRIEF DESCRIPTION OF THE DRAWINGS

FIG. 2A labeled prior art depicts the performance of a known NiTiFe SM strip, while

DETAILED DESCRIPTION OF EMBODIMENTS OF THE INVENTION

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Figure 1A:
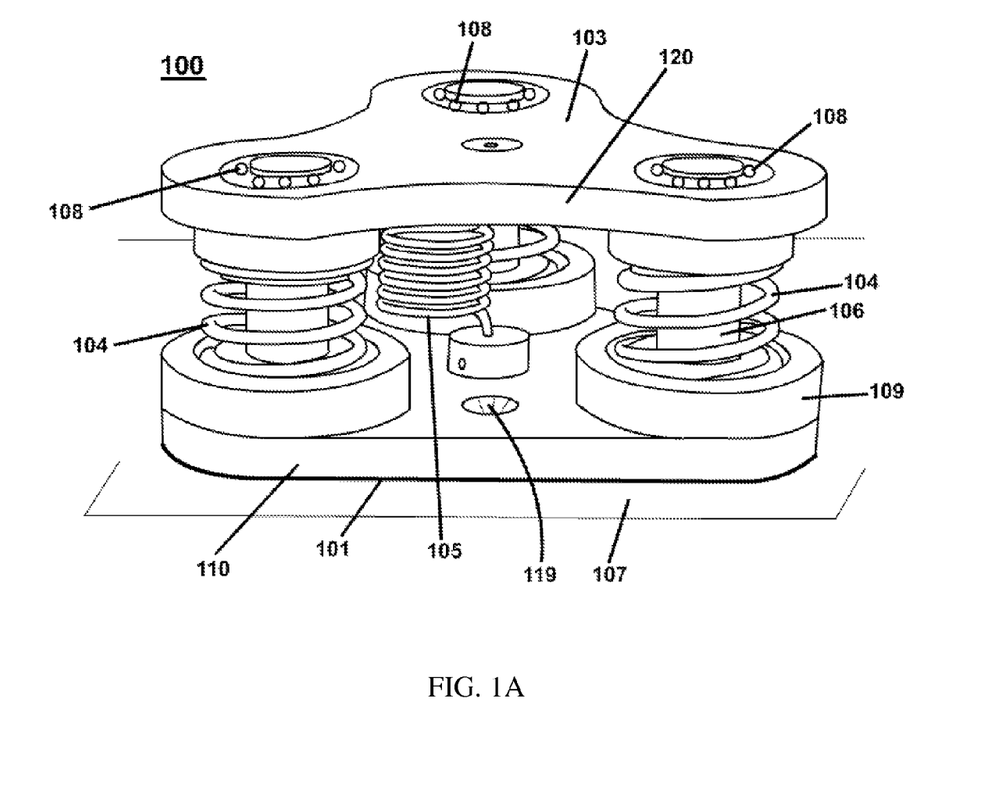
FIG. 1A depicts an exemplary thermal conduction switch in a parallel setup according to an embodiment of the invention.

Embodiments of the present invention generally describe high-performance, light, reliable and mechanically simple thermal conduction switches. SM-based thermal conduction switches according to embodiments of the invention typically provide a phase change temperature <273 K, range of transformation <40 K such as <20 K, low hysteresis (e.g. <10 K), and high displacement (>1 mm, such as about 2 to 4 mm). FIG. 1A shows an exemplary thermal conduction switch 100 including a SM control member 104 according to an embodiment of the present invention. Thermal conduction switch 100 comprises a thermally-conductive stationary first member 110 shown as a stationary plate 110 having a first thermal contact 101, and a thermally-conductive movable second member 120 shown as a movable plate 120 having a second thermal contact 103. First thermal contact 101 is shown comprising an optional contact layer 101 of a high thermal conductivity material that is different as compared to the material comprising the stationary plate 110, such as a metal foil. Stationary plate 110 includes structure for securing the first member as a stationary member shown in FIG. 1A as holes for mounting 119, such as for use with mounting fasteners (e.g. screws).

A thermally conductive coupler 106 is interposed between the stationary plate 110 and the movable second plate 120 for thermally coupling the stationary plate 110 to the movable plate 120. The thermally conductive coupler 106 is affixed to the stationary plate 110. Thermally conductive coupler 106 can be formed from the same material as the stationary plate 110 or from another thermally conductive material. The movable plate 120 can have bearings 108 attached to it for smoother sliding with respect to the thermally conductive coupler 106 which is generally affixed to stationary plate 110. The stationary plate 110 is in constant thermal communication with a body 107 that is either thermally regulated or requiring thermal regulation. This present description of thermal conduction switch 100 will assume body 107 requires thermal regulation and will refer to this body as body requiring thermal regulation 107.

As used herein, thermally conductive refers to a thermal conductivity of at least 25 W/m·K at 300 K. In a first position, such as before or after phase change of the SM material provided by the SM control member 104, the second thermal contact 103 of the movable plate 120 is in thermal communication with a thermally regulated body (not shown). As described above, in another embodiment of the invention the position and location of the thermally regulated body and the body requiring thermal regulation can be reversed (i.e. the plate 110 can be in constant thermal communication with a thermally regulated body while the plate 120 can be in switchable thermal communication with a body requiring thermal regulation).

In a typical embodiment, the stationary plate 110 is in continuous contact with the body requiring thermal regulation 107 and the movable plate 120 is in periodic thermal contact with a cooler body that is thermally regulated. For example; heat transfer may occur between the warmer body 107 and the cooler body above a predetermined temperature.

The SM control member 104 shown as a control spring 104 in FIG. 1A is also interposed between the stationary plate 110 and the movable plate 120. The thermal conduction switch 100 also comprises at least one deformable member 105 shown in FIG. 1A as a bias spring 105. The bias spring 105 may generally be any type of spring and is operable to resist the movable plate 120 moving away from or towards stationary plate 110, such as a helical spring, and may be either a compression or tension spring.

The thermally conductive coupler 106 shown in FIG. 1A comprises a support rod that functions to guide the movement of the movable plate 120 and conduct heat between the movable plate 120 and the stationary plate 110. High thermal conductivity greases (not shown) may be used to increase thermal conductivity between thermally conductive coupler 106 and plates 110 and 120. The control springs 104 shown in FIG. 1A are positioned radially outside the thermally conductive couplers 106.

In certain embodiments of the present invention, the shape of the control spring 104 determines the distance between the plates 110 and 120 by switchably moving the movable plate 120. In such embodiments, when SM control member 104 comprises a control spring 104, upon phase change of the SM material the movable plate 120 moves such that the distance between the stationary plate 110 and movable plate 120 changes by at least 1 mm.

In the embodiment shown in FIG. 1A, the control springs 104 exert a force to separate the stationary plate 110 and the movable plate 120, which is countered by the force that acts to move the plates 110 and 120 toward one another (inward) provided by the bias spring 105. In a typical embodiment, the force exerted outward by the control springs 104 is decreased when the SM alloy of SM control spring 104 undergoes a phase change upon cooling. Following phase change, the force exerted by the bias spring 105 inward overcomes the force exerted by the control springs 104 outward, causing the movable plate 120 to move towards the stationary plate 110 and thus retract from the body that is thermally regulated and is generally cooler than the body requiring thermal regulation 107. Other embodiments of the invention (not shown) can include the control spring pulling in (tension springs) and the bias spring pushing out (compression springs) and the thermally regulated body being warmer than the body requiring thermal regulation.

As known in the art after a sample of the SM material has been deformed from its original configuration, it regains its original geometry by itself in response to some trigger. For example, the trigger can be temperature, an electric current, or a magnetic field. A suitable SM material may be an SM alloy, SM polymer, or other SM material. It may be based on any of the main types of SM alloys. NiTi-based alloys generally have the advantage of superior mechanical properties when compared to copper-based SM alloys. The copper SM alloys generally have the advantage of lower cost. The SM material may also comprise NiTi alloys with Fe additions for low hysteresis phase transformations at low temperatures.

In the embodiment shown in FIG. 1A, when the SM material undergoes phase change upon heating a shape change results, wherein the shape change results in the plates 110 and 120 separating further from one another. In a second position, such as after phase change upon cooling, the movable plate 120 is no longer in thermal communication with the body requiring thermal regulation. Thus, thermal conduction switch 100 is either thermally open or thermally closed depending on the phase-state of the SM control spring 104.

The spring shape of SM control spring 104 provides relatively high stroke upon phase change. However, other shapes of the SM control member 104 can generally be used. The SM control member 104 can be any type of spring, including but not limited to helical springs, leaf springs, wave springs, cantilevered springs, or torsion springs. The SM member 104 can also take other forms, such as a plurality of spring washers or one or more wires. In some embodiments of the present invention, the SM control member 104 is a helical spring, and may be either compression or tension spring. Compression springs for control member 104 make thermal conduction switch 100 more shock resistant and not requiring mechanical fastening. As used herein, compression springs are springs which expand upon heating as opposed to tension springs which compress upon heating.

The SM control spring 104 coupled between the respective members such as plates 110 and 120 can be coupled through an intermediate material 109 that has a thermal conductivity that is significantly different relative to the thermal conductivity of the respective members. As used herein, a "substantially different" thermal conductivity is defined to be different by at least 10%: One function for the intermediate material with a thermal conductivity that is substantially different from the respective members is to influence the thermal gradient in the SM control spring 104 that occurs during normal operation when switch 100 is thermally closed. In one embodiment the intermediate material 109 comprises a relatively low thermal conductivity material such as polytetrafluoroethylene (TEFLON®) which has a thermal conductivity at 300 K of about 0.23 W/m·K. The thermal conductivity of polytetrafluoroethylene is at least two (2) orders of magnitude lower as compared to metals which normally comprise the first and second members. As shown in FIG. 1A, the intermediate material 109 serves to thermally couple the control spring 104 to the stationary plate 110 and thereby alter the thermal gradient that develops in control spring 104 during operation of switch 100 when closed. The coupling of the control spring 104 between the first member such as stationary 110 and the second member such as movable plate 120 through the intermediate material 109 can be in series with the control spring 104 with the intermediate material either placed between the first member 110 and the control spring 104 or the second member 120 and the control spring 104, or both.

As shown in FIG. 1A, the control springs 104 are arranged in a triangular fashion, each control spring 104 occupying the corner of a conceptual equilateral triangle. Although three (3) control springs 104 are shown in FIG. 1A, generally any number of control springs 104 in any configuration may be used. If a plurality of control springs are present the thermal conduction switch 100 will generally have increased reliability and increased contact force between the movable plate 120 and the thermal body, although as few as one control spring 104 may be adequate in some embodiments. If more than one control spring 104 is present, the control springs 104 may be of varying dimensions and compositions. However, performance will generally be enhanced and simplified if all control springs have substantially the same dimension and SM composition. Springs have one advantage of significantly higher stroke as opposed to different forms of SM material actuator, such as strips. Helical springs particularly tend to provide very high stroke. Simpler forms of actuators, such as strips, have an advantage of ease of manufacture, but generally have much lower stroke than springs.

The control spring 104 generally comprises a SM alloy, such as of the NiTiFe type. In further embodiments of the invention the control spring 104 comprises an SM material that undergoes a phase change at low temperature such as from 15K to 273K. In further embodiments of the invention the SM material for the control spring 104 provides a low-hysteresis phase change over a low-transformation range.

The stationary plate 110 and movable plate 120 may generally be made of any thermally conductive material. In embodiments of the present invention the stationary plate 110 may be made of a thermally-conductive metal or alloy, such as a copper-beryllium alloy. An advantage of copper-beryllium alloys is the combination of high thermal conductivity and mechanical strength. However, the stationary plate 110 may generally comprise any suitable thermally conductive material. In some embodiments of the present invention the stationary plate 110 is in constant thermal communication with the body requiring thermal regulation 107. As described above the first thermal contact 101 of stationary plate 110 may comprise a contact layer 101 of a high thermal conductivity material that is different as compared to the material comprising the stationary plate 110. Such a contact layer 101 may comprise a thermally conductive foil, that generally provides a thermal conductivity of $\geq 50$ W/m·K. In one embodiment the contact layer 101 comprises an indium foil. At 300 K, indium provides a thermal conductivity of 81.8 W/m·K. Such a contact layer may also be placed above the movable plate 120.

The contact layer 101 may be connected to the stationary plate 110 or the movable plate 120 by various methods known to those skilled in the art. The stationary plate 110 or movable plate 120 may generally be of any shape that provides adequate thermal conduction between them and their contacting thermal bodies, and that provides adequate thermal conduction between the stationary plate 110 and the movable plate 120. Typically, the surfaces can be chosen to achieve the required thermal conductivity. If higher thermal conductively is desired the respective surfaces can be mated in a non-planar fashion using hill and valley, curved or ridged morphologies to maximize the contact area. Those having ordinary skill in the art are capable of varying the shape and surface of the stationary plate 110 and the movable plate 120 as needed for the particular application.

Figure 1B:
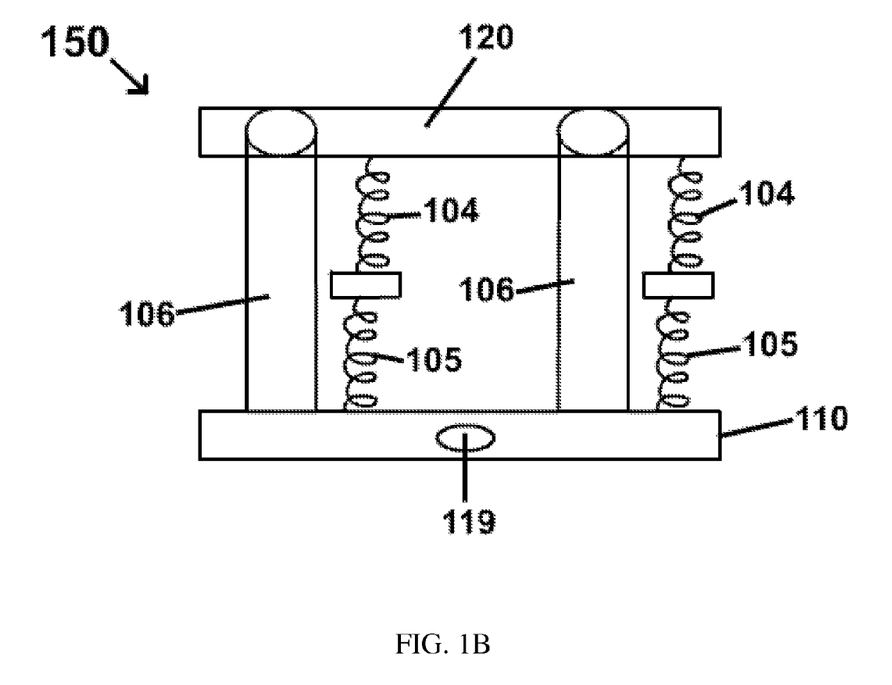
FIG. 1B is a simplified depiction of an exemplary thermal conduction switch in a series setup according to an embodiment of the invention.

FIG. 1B simplified depiction of an exemplary thermal conduction switch 150 in a series setup according to an embodiment of the present invention. In the series setup shown the bias spring 105 is coupled to act in-line with the control member 104, such as an SM control spring 104. The principle of operation of thermal conduction switch 150 is identical to that of the parallel setup shown in FIG. 1A and described above but is advantageous in situations where the switch has to be compact and contained and possess a smaller footprint.

In embodiments of the present invention the SM material for the control spring 104 is a low hysteresis low transformation range SM material, as these materials have the advantage of short cycle times and high precision. "Hysteresis" in the context of SM alloys as used herein refers to the difference in temperatures between the temperature at which phase change occurs upon heating and the temperature at which phase change occurs upon cooling. "Low hysteresis" in the context of SM materials means a material in which the temperature at which phase change occurs upon heating is relatively close to the temperature at which phase change occurs upon cooling. Typical hysteresis associated with known SM alloys is generally in the range of 20-40° C., or more (See FIG. 2A described below). Low hysteresis SM alloys according to the embodiments of the present invention generally have much lower hysteresis, defined herein to be <10° C. (<10 K), such as <5 K, and in certain embodiments <2 K, or <1 K. Transformation temperature range refers to the difference between the start of the transformation and the finish of the transformation. Typical transformation temperature ranges associated with known SM alloys in use are generally in the range of 25-60 K, or more (See FIG. 2A described below). Low transformation temperature range SM alloys according to the embodiments of the present invention generally have much lower transformation temperature range, defined herein to be <20 K, such as <15 K. In embodiments of the present invention, the SM control spring 104 also provides high displacement upon phase change. As described above, in the case of linear spring displacement, the displacement provided by the control spring 104 is generally at least 1 mm. In some embodiments, the displacement is over about 2 mm, and in some embodiments the displacement is >4 mm, such as between about 4 or 5 mm. As described in the Examples below, FIG. 2B shows a SM control spring 104 according to an embodiment of the invention which provides <2 K hysteresis, <15 K transformation temperature range and above 4 mm of displacement.

In embodiments of the present invention the SM material is a low-temperature phase change material. Low-temperature phase change SM materials undergo phase change (and thus a shape change) at temperatures typically below 273 K. Some low-temperature phase change SM materials undergo phase change in temperature ranges from 15-273 K, or more narrowly from 250-270 K. Some low-temperature phase change SM materials according to the invention undergo phase change at temperature ranges as low as 15-120 K, and in one embodiment is in the range from 116-122 K.

Such low phase-change temperatures have been recognized by the Present Inventors to be achieved by varying the amount of Fe and the ratio of Ni to Ti in an NiTiFe SMA. In one particular embodiments of the invention, the temperature of phase-change is lowered by including at least 3.2% Fe. Generally, it has been found that the addition of Fe to a NiTi SM material lowers the temperature at which phase-change will occur. An advantage of low-temperature phase change SM materials is their utility in thermal conduction switches that control very low temperature systems, such as liquified gasses.

The switch will generally be of higher precision and performance if the alloy has very low hysteresis and low transformation temperature range, and the alloy's temperature of phase change upon heating and temperature of phase change upon cooling are within 2 K of one another and the transformation temperature range <15 K. The switch will be of even higher precision and performance if the alloy's temperature of phase change upon heating and temperature of phase change upon cooling are within 1 K of one another. The SM alloy may achieve phase-change between about 240-280 K, or alternatively between 260-270 K, 92 and 120 K, or between 118 and 120 K. In further embodiments of the present invention, the alloy comprises NiTiFe having an Fe % of at least 2 atomic %, such as substantially the composition $Ni_{47.07}Ti_{49.66}Fe_{3.27}$.

In embodiments of the present invention, particular thermomechanical processing is used to form SM springs according to the invention. The control spring 104 can be made from extruded SM wire. In further embodiments of the present invention, the wire is only shape set and is not solutionized or subjected to ageing treatment. The shape-set can be at about 520 to 600° C., such as 550° C., for 15 to 25 minutes, such as 20 minutes, followed by an ice-water quench. Conventional shape setting temperature are known to be at a lower temperature, such as between 400° C. to 500° C. for binary NiTi alloys.

Figure 3A:
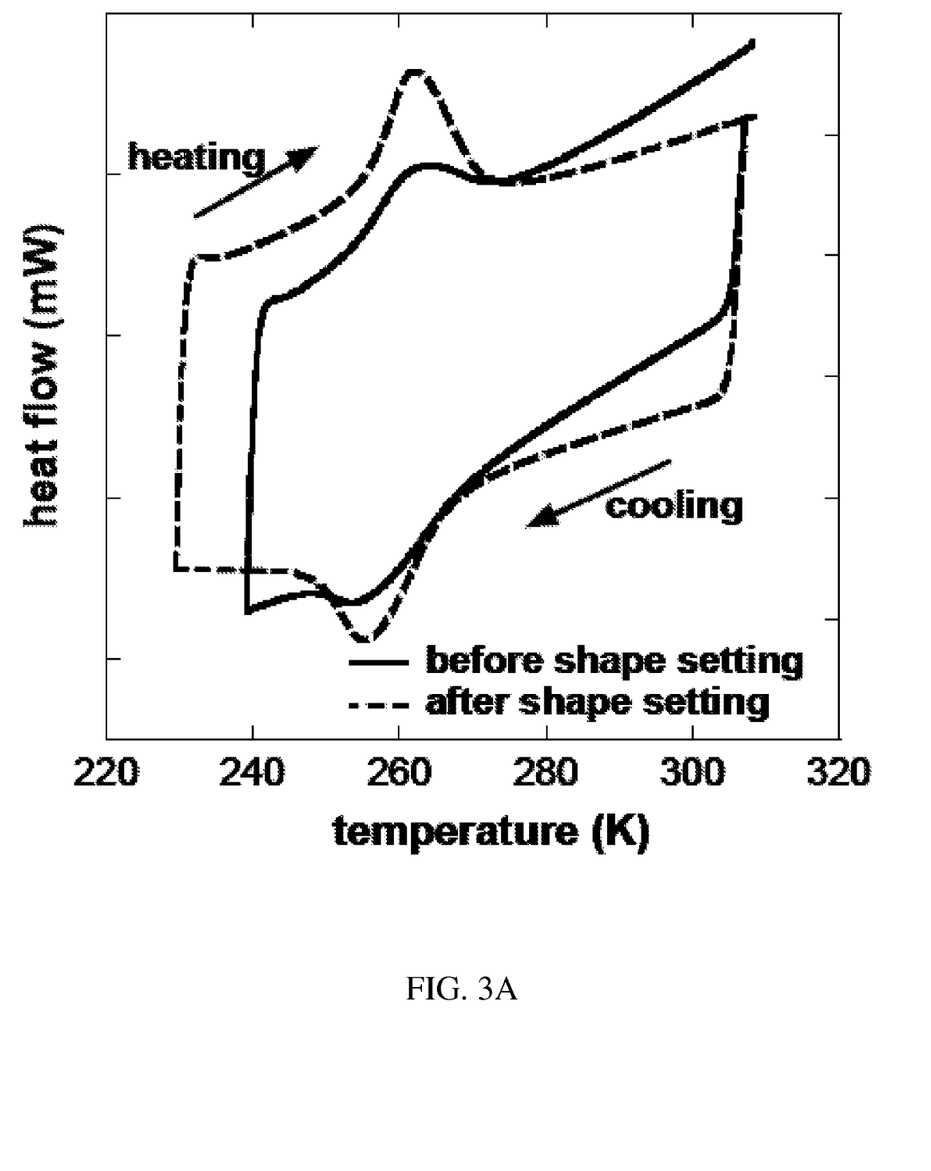
FIG. 3A depicts a differential scanning calorimetry (DSC) response of a NiTiFe low-hysteresis SM spring according to an embodiment of the invention.
Figure 3B:
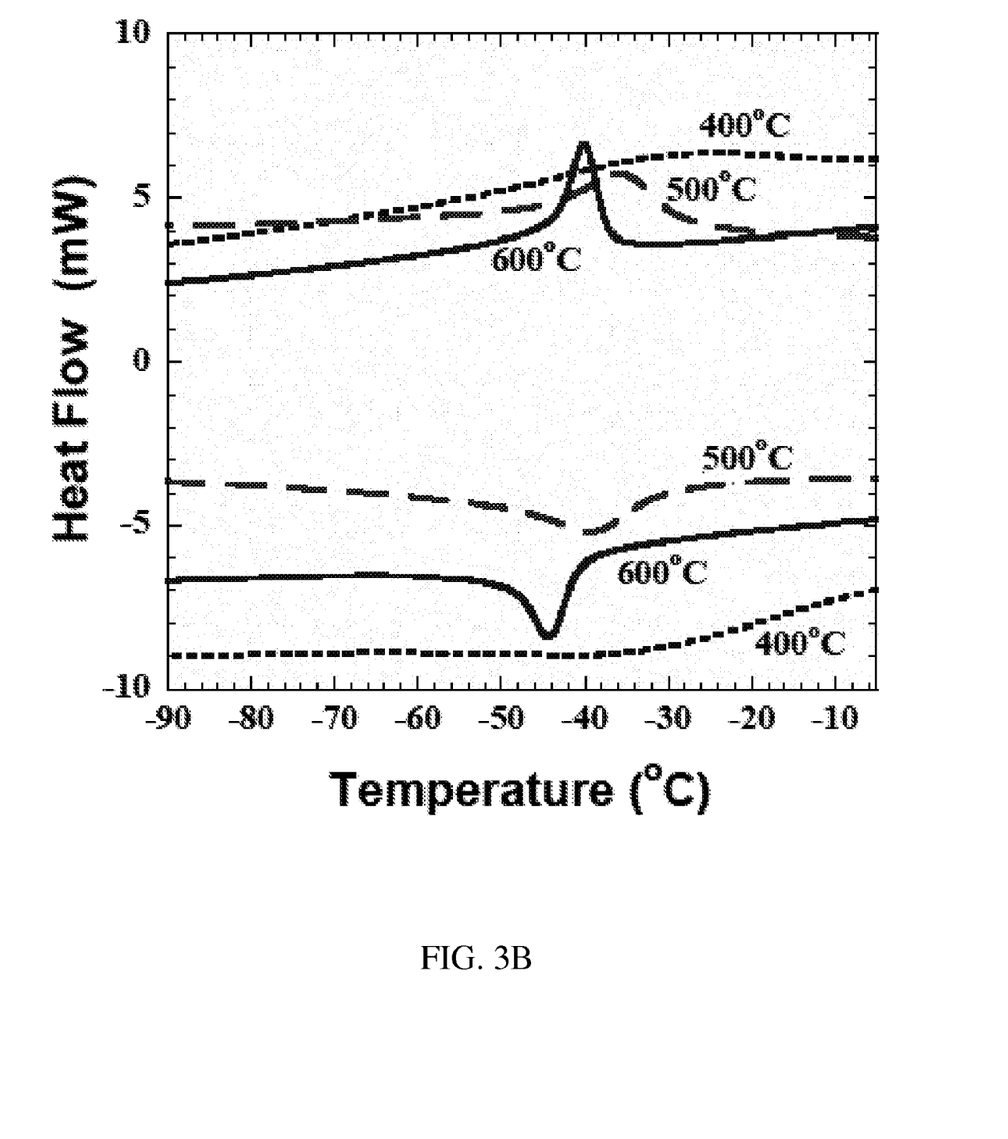
FIG. 3B depicts the effect of shape setting temperature according to an embodiment of the invention.
Figure 3C:
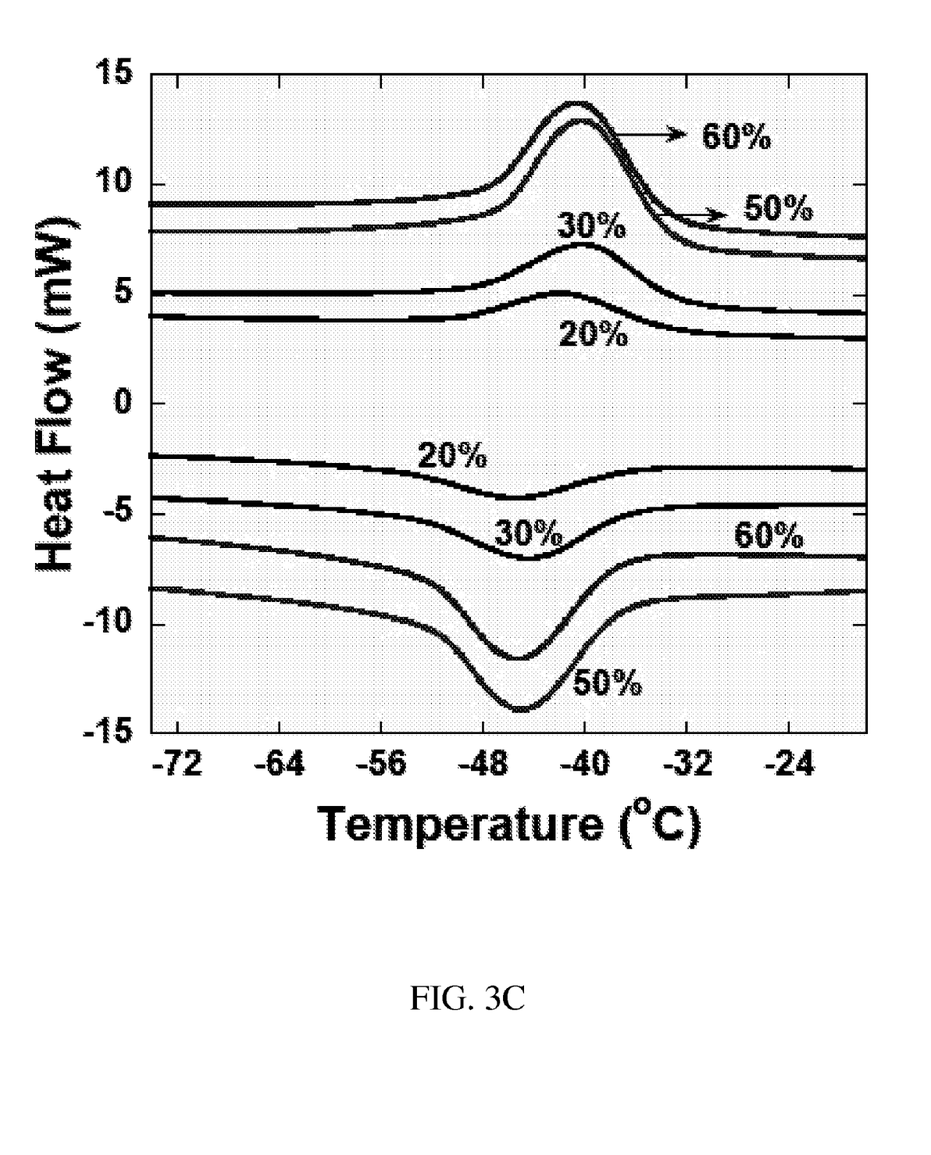
FIG. 3C the effect of percentage reduction in area during extrusion on the differential scanning calorimetry (DSC) response in a NiTiFe alloy, according to an embodiment of the invention.

The Present Inventors have recognized through experiments similar to those depicted in FIG. 3B and FIG. 3C that unsolutionized extruded wire shape set at the above described higher than conventional shape setting temperatures provides a significantly higher density of defects as compared to conventional solutionized extruded wire shape set at lower temperature. Higher defect density has been found to allow achieving low temperature low hysteresis phase change without increasing transformation temperature range. While increased dislocation densities can reduce the hysteresis (desirable) they can also increase the transformation temperature range (undesirable).

Conventional solutionized extruded SM wire generally provides dislocation densities $<10^5/cm^2$. The higher level of metallurgical defects obtained from shape set unsolutionized extruded wire, such as a dislocation density of $\geq 10^5/cm^2$, typically $\geq 10^8/cm^2$ has been found by the Present Inventors to significantly reduce hysteresis, such as to a level <2 K while keeping the transformation temperature range to <15 K. This low hysteresis low transformation range level can be compared to hysteresis and transformation range levels for a conventional NiTiFe SM strip (See FIG. 2A described below).

In embodiments of the present invention, the body requiring thermal regulation 107 and the second body that is thermally regulated may generally be any structure or mechanism that benefits from thermal regulation or is useful in thermal regulation. Examples of such bodies include but are not limited to heat sinks, heat sources, or dewars of liquified gasses (such as oxygen or methane). In one embodiment of the invention the thermal conduction switch is used to achieve liquefaction of a cryogen (such as methane) through periodic thermal contact between a reservoir of the cryogen and a reservoir of another cryogen that is thermally regulated (such as oxygen).

EXAMPLES

The following non-limiting Examples serve to illustrate selected embodiments of the invention. It will be appreciated that variations in proportions and alternatives in elements of the components shown will be apparent to those skilled in the art and are within the scope of embodiments of the present invention.

Figure 2A:
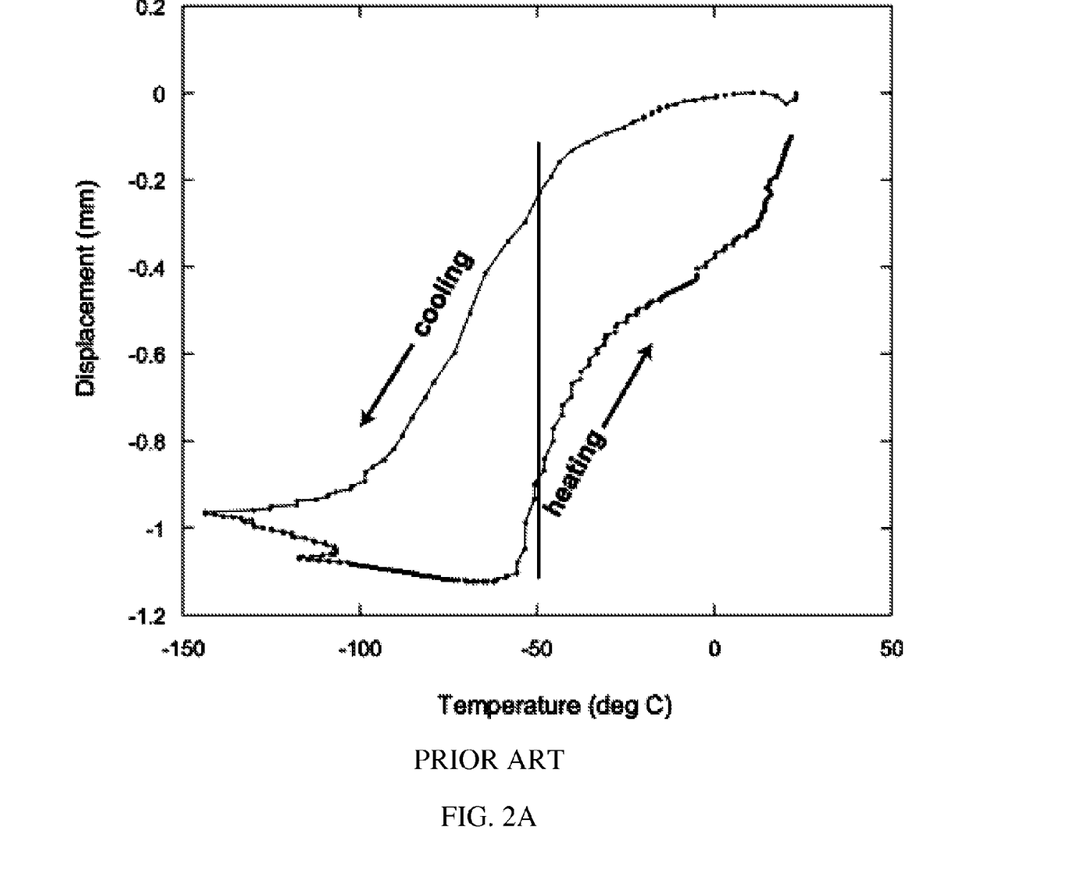
Figure 2B:
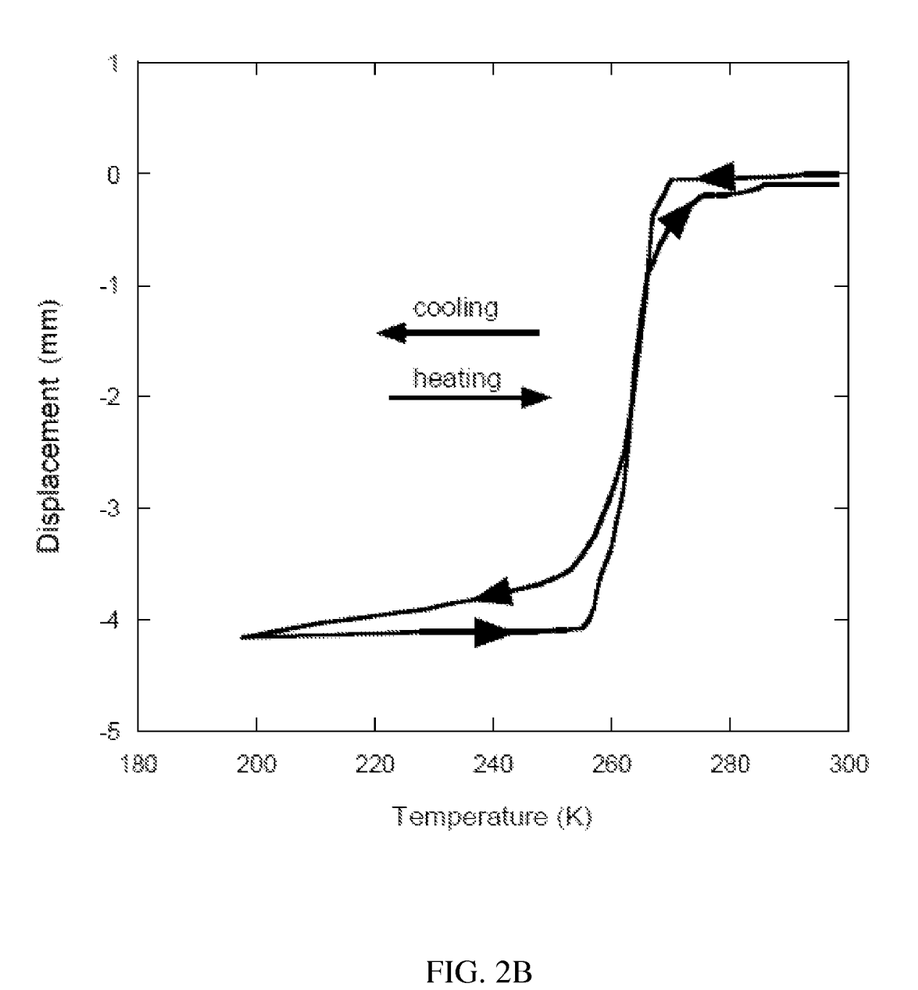
FIG. 2B depicts the performance a non-solutionized extruded shape set SM spring comprising NTiFe according to an embodiment of the invention.

FIG. 2A labeled prior art depicts the performance of a known NiTiFe SM strip. The known SM strip evidences a hysteresis of at least 30 K, range of transformation of about 100 K, and a displacement of no more than about 1 mm. FIG. 2B depicts the performance a SM spring comprising NiTiFe according to an embodiment of the invention. The SM spring was shape set at high temperature and was not solutionized or subjected to any ageing treatment. The shape-set was performed at 520° C. for 20 minutes followed by an ice-water quench. Upon heating, the SM spring is shown to lengthen relative to its length below the phase change temperature. The hysteresis shown in FIG. 2B is <2 K, the range of transformation is <20 K and the displacement shown is around 4 mm. This relatively long displacement length helps in achieving enhanced thermal isolation in the thermally open state and an ability to tailor the contact force over the displacement length. The utilization of the cubic (austenite) to trigonal (R-phase) phase transformation in NiTiFe shape memory alloys is believed to be responsible for the reduced transformation hysteresis. However, embodiments of the invention may be practiced without the theoretical aspects presented. Moreover, the theoretical aspects are presented with the understanding that Applicants do not seek to be bound by the theory presented.

FIG. 3A depicts a differential scanning calorimetry (DSC) response of a NiTiFe low-hysteresis SM spring according to an embodiment of the invention. The results show the austenite to Rphase transformation during cooling and the reverse transformation during heating. The first curve, represented by the darker line, is the NiTiFe wire (as received) before any prior heat treatment. The second curve, represented by the lighter line, received a heat treatment of 793 K for 20 minutes during the shape-setting procedure and was subsequently ice-water quenched. A slightly sharper peak resulted after the heat treatment, for both the austenite to R-phase transformation and the reverse transformation indicative of a reduction in the transformation. FIG. 3B illustrates the effect of shape setting temperature and FIG. 3C illustrates the effect of percentage reduction in area during extrusion on the differential scanning calorimetry (DSC) response in a NiTiFe alloy, respectively, according to embodiments of the invention. These FIGs. show the complex effects of these parameters on the phase transformation.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. A thermal conduction switch, comprising:
    a thermally-conductive first member having a first thermal contacting surface, comprising a structure for securing said first member as a stationary member to a thermally regulated body or a body requiring thermal regulation;
    a movable thermally-conductive second member having a second thermal contacting surface,
    a thermally conductive coupler interposed between said first member and said second member for thermally coupling said first member to said second member;
    at least one control spring coupled between said first member and said second member, wherein said control spring comprises a NiTiFe comprising shape memory (SM) material that provides a phase change at a temperature <273 K, a transformation range <40 K and a hysteresis of <10 K, and
    a bias spring between said first member and said second member, wherein said phase change provides a distance change between said first and said second member by at least 1 mm.

2. The thermal conduction switch of claim 1, wherein said bias spring and said control spring are arranged parallel to one another.

3. The thermal conduction switch of claim 1, wherein said bias spring and said control spring are arranged in series to one another.

4. The thermal conduction switch of claim 1, wherein said control spring comprises a compression spring.

5. The thermal conduction switch of claim 1, wherein said control spring comprises a tension spring.

6. The thermal conduction switch of claim 1, wherein said SM material comprises at least 2 atomic % Fe.

7. The thermal conduction switch of claim 1, wherein said distance change is >2 mm, said transformation range is <20 K and said hysteresis is <2 K.

8. The thermal conduction switch of claim 1, further comprising a contact layer on said first member that has a different composition as compared to material comprising said first member.

9. The thermal conduction switch of claim 8, wherein said contact layer comprises a metal foil that provides a thermal conductivity at 300 K of $\geq 50$ W/m·K.

10. The thermal conduction switch of claim 1, further comprising a contact layer on said second member that has a different composition as compared to a material comprising said second member.

11. The thermal conduction switch of claim 10, wherein said contact layer comprises a metal foil that provides a thermal conductivity at 300 K of $\geq 50$ W/m·K.

12. The thermal conduction switch of claim 1, wherein said SM material comprises at least 3 atomic % Fe and said control spring comprises unsolutionized extruded SM wire, said unsolutionized extruded shape set SM wire shape set having a dislocation density $\geq 10^5/\text{cm}^2$.

13. The thermal conduction switch of claim 12, wherein said dislocation density is $\geq 10^8/\text{cm}^2$.

14. The thermal conduction switch of claim 13, wherein said SM material comprises substantially $Ni_{47.07}Ti_{49.66}Fe_{3.27}$.

15. The thermal conduction switch of claim 1, further comprising an intermediate material that has a thermal conductivity that is substantially different from respective materials comprising both said first member and said second member, interposed between said control spring and at least one of said first and said second member.

16. A method of transferring heat between a first thermally regulated body and a second thermal body requiring thermal regulation, comprising:

thermally and physically securing one of said first and second bodies to a first thermally conductive member, wherein said physical coupling renders said first member a stationary member;

thermally coupling the other of said first and second bodies to a second thermally conductive member, wherein said other of said first and second bodies is not secured to said second member to render said second member a movable member;

coupling at least one shape memory (SM) control spring between said stationary member and said movable member, wherein said control spring comprises a NiTiFe comprising SM material that provides a phase change at a temperature <273 K with a transformation range <40 K and a hysteresis of <10 K, wherein said phase change provides a distance change between said first and said second plates of at least 1 mm, and transferring heat between said first and second bodies when the temperature of either of said first and second bodies is below said phase change temperature.

17. The method of claim 16, wherein said distance change is >2 mm, said transformation range is <20 K and said hysteresis is <2 K.

18. The method of claim 17, wherein said SM material comprises at least 3 atomic % Fe and said control spring comprises unsolutionized extruded SM wire, said unsolutionized extruded SM wire shape set having a dislocation density $\geq 10^5/cm^2$.

19. The method of claim 16, wherein said control spring is thermally coupled to at least one of said stationary member and said movable member through an intermediate material that has a thermal conductivity that is substantially different from respective materials comprising both said stationary member and said movable member.

20. The method of claim 16, wherein said phase change temperature is in the range from 116-122 K and said first and second bodies comprise liquid oxygen and liquid methane, respectively.

* * * * *